United States Patent
Patterson et al.

(10) Patent No.: US 6,955,333 B2
(45) Date of Patent: Oct. 18, 2005

(54) APPARATUS AND METHOD OF WIRELESS DATA TRANSMISSION

(75) Inventors: Wade C. Patterson, Huntsville, AL (US); Thomas J. Watson, Madison, AL (US)

(73) Assignee: Geberit Technik AG, Jona (CH)

( * ) Notice: Subject to any disclaimer, the term of this patent is extended or adjusted under 35 U.S.C. 154(b) by 343 days.

(21) Appl. No.: 10/037,343

(22) Filed: Oct. 23, 2001

(65) Prior Publication Data

US 2005/0082503 A1 Apr. 21, 2005

Related U.S. Application Data

(60) Provisional application No. 60/267,441, filed on Feb. 8, 2001, provisional application No. 60/242,898, filed on Oct. 24, 2000.

(51) Int. Cl.⁷ .............................................. F16K 31/02
(52) U.S. Cl. .............................................. 251/129.04
(58) Field of Search ................ 251/129.04; 250/338.1, 250/339.02, 349, 339.2; 4/623; 455/92

(56) References Cited

U.S. PATENT DOCUMENTS

| 390,960 A | 10/1888 | Gustin |
|---|---|---|
| 1,940,090 A | 12/1933 | Hetherington |
| 2,539,598 A | 1/1951 | Suska |
| 4,145,769 A | 3/1979 | MacFarlane et al. |
| 4,420,811 A | 12/1983 | Tarnay et al. |
| 4,563,780 A | 1/1986 | Pollack |
| 4,682,728 A | 7/1987 | Oudenhoven et al. |
| 4,700,884 A | 10/1987 | Barrett et al. |
| 4,854,499 A | 8/1989 | Neuman |
| 4,923,116 A | 5/1990 | Homan |
| 4,965,448 A | 10/1990 | Morse, et al. ............ 250/252.1 |
| 4,974,636 A | 12/1990 | Cogger |
| 5,062,453 A | 11/1991 | Saadi et al. |
| 5,170,514 A | 12/1992 | Weigert |
| 5,217,035 A | 6/1993 | Van Marcke |
| 5,243,717 A | 9/1993 | Yasuo |
| 5,281,808 A * | 1/1994 | Kunkel ....................... 250/221 |
| 5,328,597 A | 7/1994 | Boldt, Jr. et al. |
| RE35,018 E | 8/1995 | Homan |
| 5,566,702 A | 10/1996 | Philipp |
| 5,570,869 A | 11/1996 | Diaz, et al. ............ 251/129.04 |
| 5,577,706 A | 11/1996 | King |
| 5,603,287 A * | 2/1997 | Houck ........................ 119/719 |
| 5,655,561 A | 8/1997 | Wendell et al. |
| 5,745,049 A | 4/1998 | Akiyama, et al. ...... 340/870.17 |
| 5,758,688 A * | 6/1998 | Hamanaka et al. .... 251/129.04 |
| 5,819,336 A | 10/1998 | Gilliam, et al. ................ 4/623 |
| 5,910,776 A | 6/1999 | Black |
| 5,915,417 A | 6/1999 | Diaz et al. |
| 6,000,429 A | 12/1999 | Van Marcke |

(Continued)

FOREIGN PATENT DOCUMENTS

EP 0 332 045 A2 9/1989

(Continued)

*Primary Examiner*—Eric Keasel
(74) *Attorney, Agent, or Firm*—Reinhart Boerner Van Deuren s.c.

(57) ABSTRACT

A remotely managed electronically operated dispensing apparatus having a transmitter for transmitting a detection signal and a communication signal is disclosed. When the detection signal is reflected from an object, the dispensing apparatus opens a valve allowing fluid to flow. The communication signal may contain maintenance, status and other information and is received by a communication device.

28 Claims, 9 Drawing Sheets

U.S. PATENT DOCUMENTS

| | | |
|---|---|---|
| 6,006,784 A | 12/1999 | Tsutsui et al. |
| 6,038,519 A | 3/2000 | Gauthier et al. |
| 6,059,192 A | 5/2000 | Zosimadis |
| 6,123,093 A | 9/2000 | D'Antonio et al. |
| 6,124,806 A | 9/2000 | Cunningham et al. |
| 2002/0088823 A1 | 7/2002 | Tabacchi, et |

FOREIGN PATENT DOCUMENTS

| | | |
|---|---|---|
| EP | 1 164 450 A1 | 12/2001 |
| JP | 62-256112 | 11/1987 |
| JP | 62-269212 | 11/1987 |

* cited by examiner

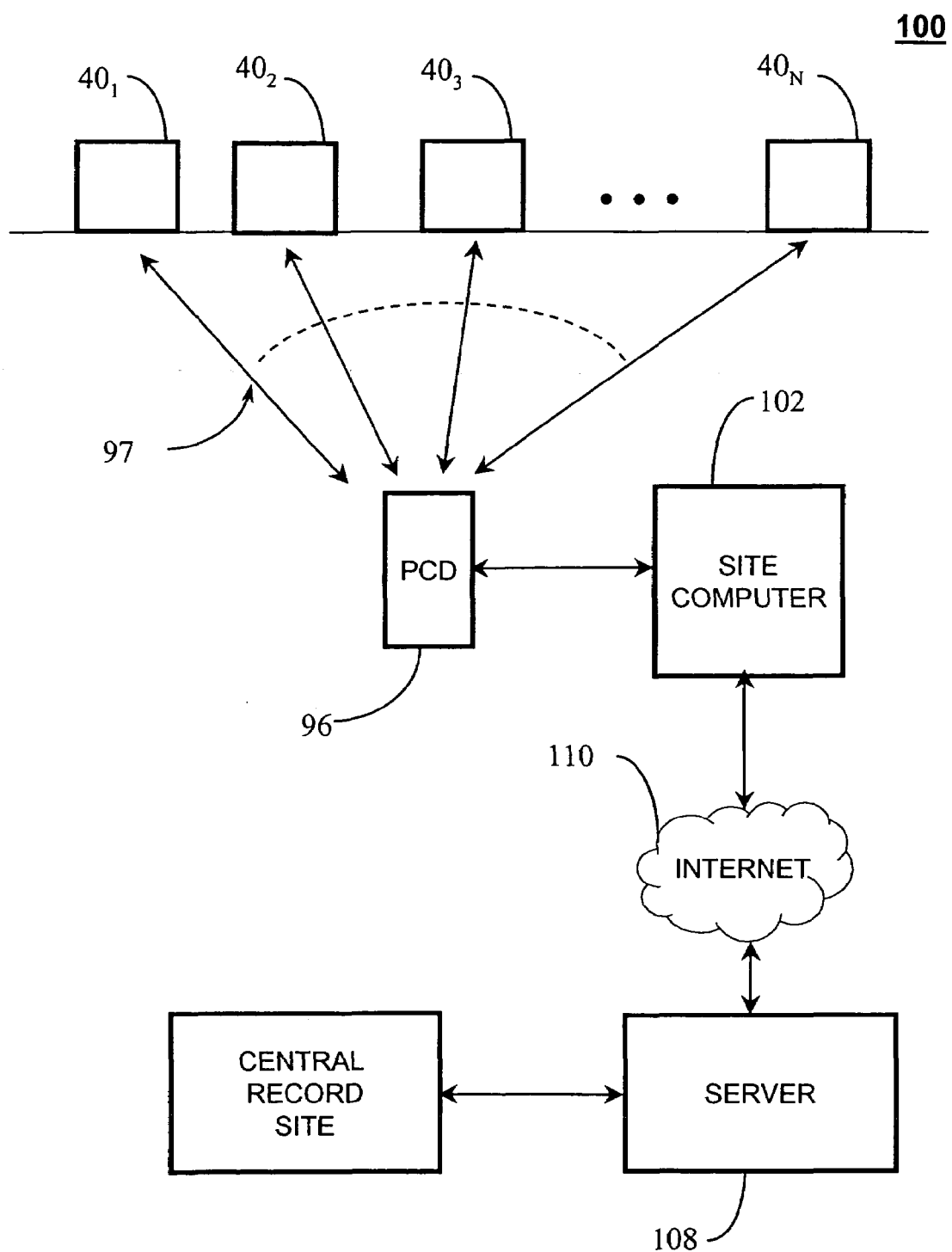

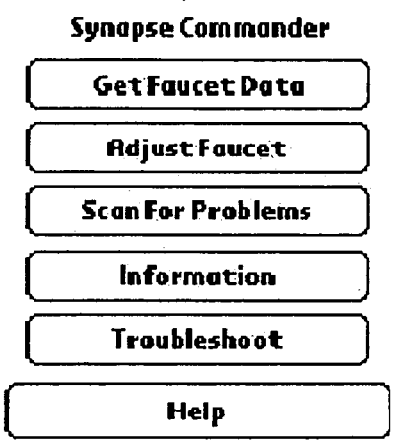

FIG. 4a

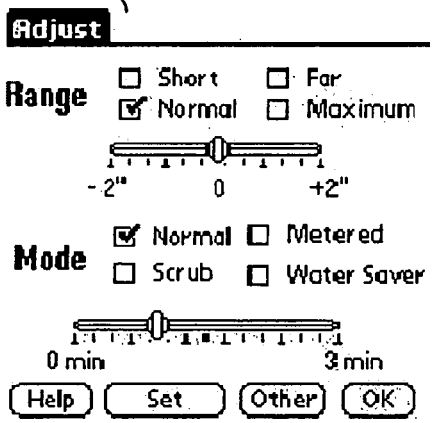

FIG. 4c

| Information |
| --- |
| Review & Modify Your Data |
| Reference Guide |
| Field Replacement Parts |
| Accessories |
| Contact Synapse |
| Contact Chicago Faucets |

Help      Ok

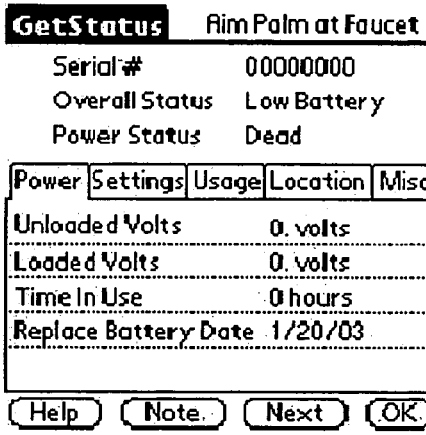

Reference Guide

MODE DEFINITIONS
NORMAL-Unit turns off 1.5 seconds after hands are removed.
METERED-Unit stays on for 10 seconds and then turns off.
SCRUB-Unit stays on for 60 seconds after removing hands.
WATER SAVER-Unit stays on 5 seconds and then turns off.

Back      Next
Common Field Problems    OK

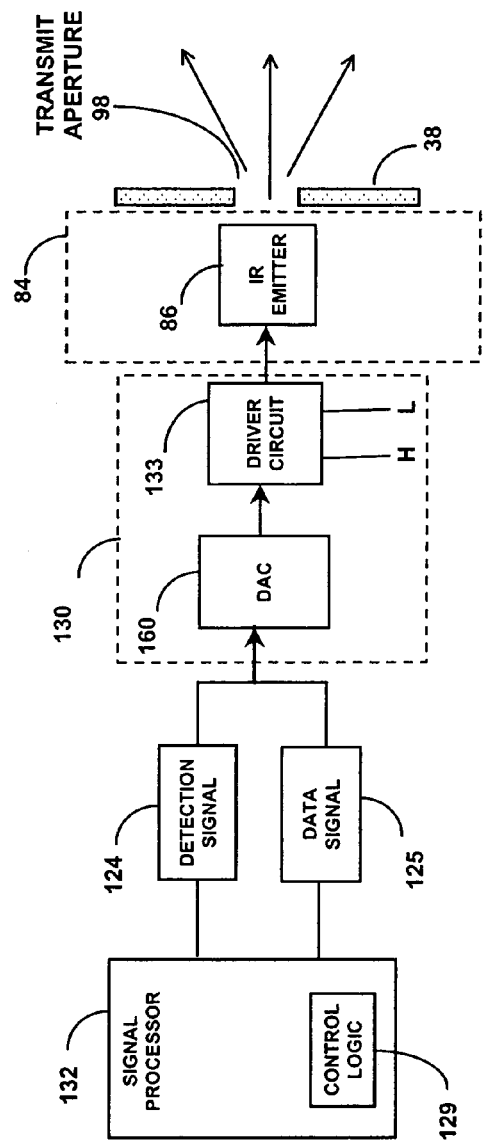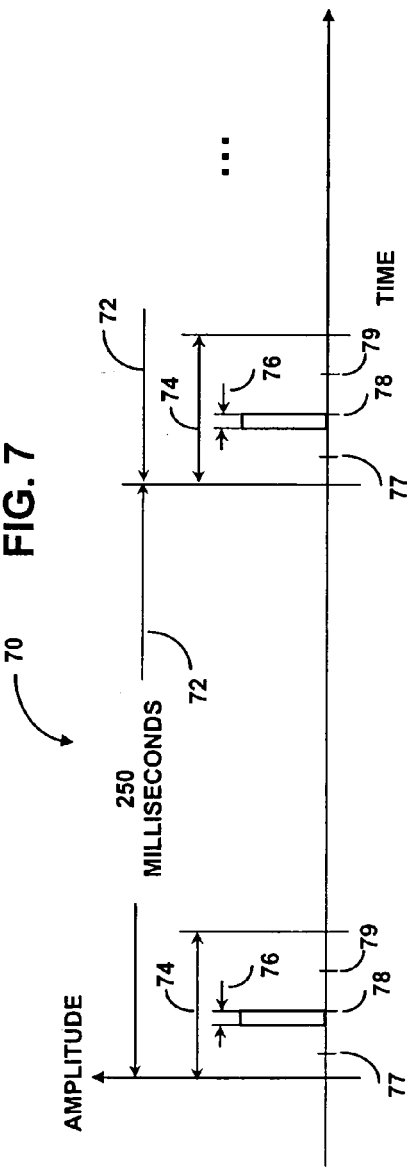

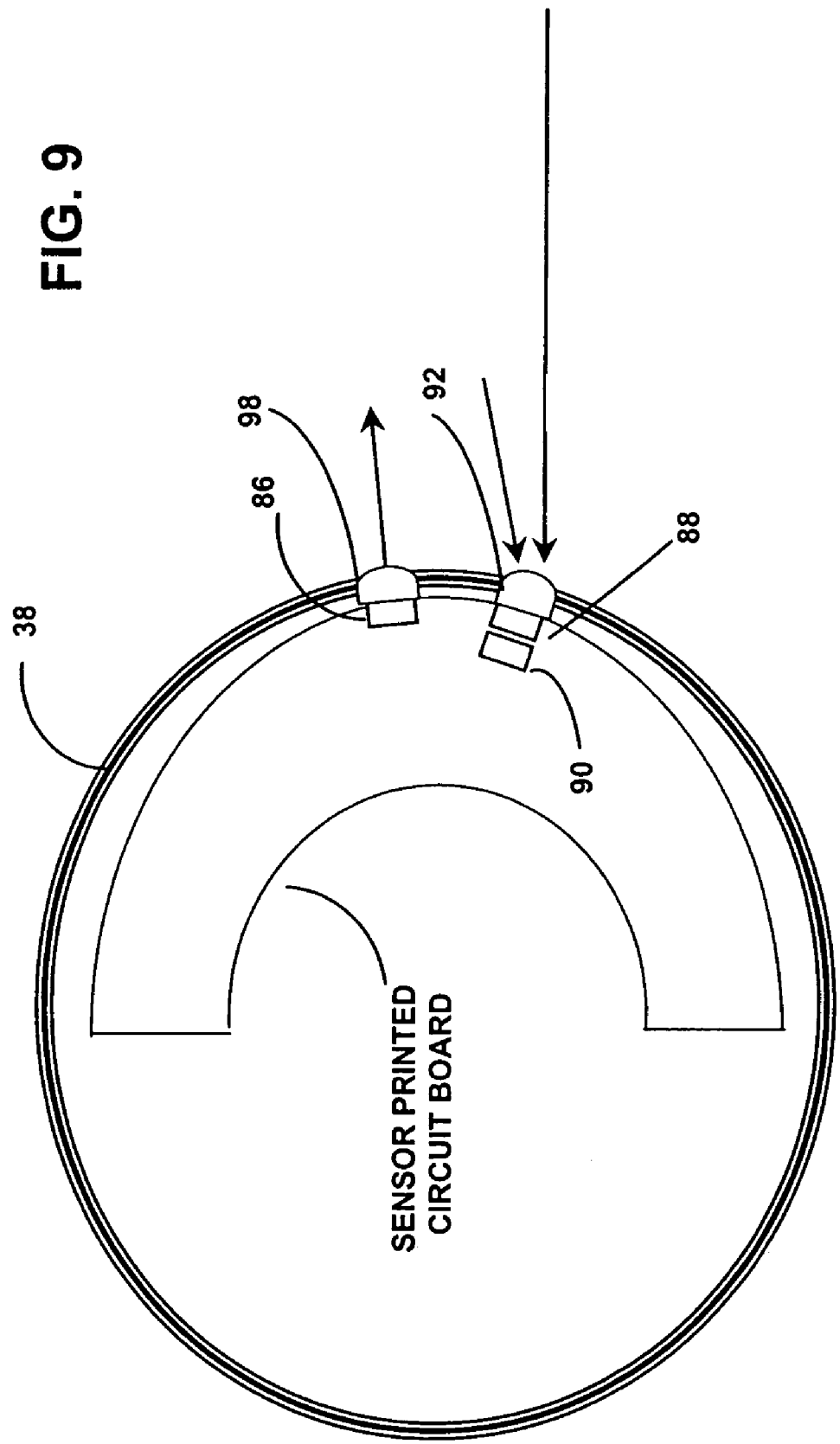

APPARATUS AND METHOD OF WIRELESS DATA TRANSMISSION

CROSS-REFERENCE TO RELATED APPLICATIONS

This application claims the benefit of U.S. Provisional Patent Application Ser. No. 60/267,441 entitled, "Remotely Managed Automatic Dispensing Apparatus and Method", filed on Feb. 8, 2001, and U.S. Provisional Patent Application Ser. No. 60/242,898 entitled, "Remotely Managed Automatic Dispensing Apparatus and Method", filed on Oct. 24, 2000, both of which are hereby incorporated by reference herein.

FIELD OF THE INVENTION

The present invention relates generally to the field of electronic or automatic flow control and dispensing devices and more particularly to data exchange by such devices. While the present invention is applicable for use with any number of dispensing devices, it is particularly well suited for the operation, management, and control of devices that control water flow, such as faucets, toilets, shower heads, and the like.

BACKGROUND OF THE INVENTION

Various methods have been employed to electronically control water flow through a water control device such as a faucet or spigot. Among the accepted methods is the use of an optical sensor typically employed in combination with an infrared ("IR") source or IR emitter that together with processing electronics, are used to control a solenoid valve. Generally speaking, a pulsed IR beam is reflected from an object (such as a user's hands or other body parts, for example) and sensed by a photo detector to determine whether to activate or deactivate the solenoid valve. Pulsed IR sensing remains at the forefront of sensing techniques used with these types of devices, due in part to its reasonable performance and low cost. Automatic water flow control devices incorporating pulsed IR technology do, however, have a number of shortcomings.

A common denominator for many of the problems associated with automatically activated flow control devices, such as faucets, is the environment in which such devices are installed and operate. For instance, existing IR sensor designs generally suffer from an inability to adapt to changes in the background signal level associated with a gradual discoloration of the sink in which the faucet is mounted, a gradual degradation of the sensor lens due to the use of abrasive cleaning compounds, a gradual degradation of the IR emitter performance, among other things. Generally, existing sensors employ a fixed sensitivity threshold that is set either at the factory or by the installer (or both). When the IR sensor sensitivity is fixed, the sensors performance will inevitably degrade with environmental changes, and when the degradation causes faulty operation, a service call may be required. In some instances, the gradual degradation will go unnoticed resulting in poor performance.

In addition, IR sensors of the type made integral with the faucet often detect reflections from the water stream dispensed from the faucet. When the IR emitter is mounted behind the aerator of the faucet, as is commonly done in the art, near-IR light is reflected back from the water stream to the IR receiver causing the water to remain on, which results in a waste of water and annoyance to the user. In such a reflection scenario, the solenoid valve does not usually deactivate until the electronics of the device causes the faucet to "time out".

Inconsistent lighting conditions, as well as water and/or soap film deposits on the optical lens of the IR sensors also cause faulty operation of an automatic flow device, such as a faucet or other device activated via IR sensing. In addition, paper towels or other debris left in the sink basin can induce misleading reflections to the IR receiver.

Servicing and maintenance of presently available automatically activated flow control devices are often burdensome and time-consuming tasks. Such tasks prove particularly burdensome for maintenance personnel in settings such as public restrooms where there are a number of automatically activated flow control devices, such as faucets or toilets, in a single room. Typically to test such flow control devices, each flow control device is manually activated to enable determination of whether or not it is malfunctioning. Moreover, calibration, recalibration, and most repair work to individual units presently require maintenance personnel to at least partially disassemble or at least manually access the electronics of the units to facilitate repair work. Such tasks may be time consuming and difficult to accomplish given the location of the device electronics (usually beneath, behind or under the counter top, toilet, or other structure supporting the device). Likewise, updating or enhancing the software or electronics of these devices usually requires maintenance personnel to access the device electronics.

In addition, calibration of today's automatically activated flow control devices is often labor intensive and inefficient with respect to devices presently on the market. The low cost IR sensing devices employed in automatically activated flow control devices vary with respect to power requirements, performance, and other criteria. As a result, readings taken by these IR sensing units (such as whether a user's hands are present beneath the aerator of a faucet) are generally non-uniform from device to device and, therefore, often result in improper activation and deactivation of some devices. Similarly, as battery power for these devices decreases over time, so does the power output of the IR sensing devices. As a result, manual calibration of conventional automatically activated flow control devices is generally required during initial installation, and thereafter on a frequent basis following extended periods of use.

Unfortunately, vandalism and water damage also adversely affect the use and proper operation of automatically activated flow control devices presently available in the art. Water often travels along the wiring harness extending from the flow control device to the device's electronics causing corrosion to the parts. On occasion, vandals may attempt to break into the electronics box associated with the device or pull the wires from either the electronics box or the faucet.

SUMMARY OF THE INVENTION

There is a need for an improved fluid dispensing system that overcomes many of the shortcomings associated with conventional automatically activated flow control devices. Such a system should provide for improved maintenance including better preventive maintenance, reduced cost of maintenance, troubleshooting help, faster transfers of information, and recording of information related to maintenance. It would further be desirable if the dispensing device consumed low power, was capable of being retrofitted into existing dispensing devices, easy to install, and low cost.

An electronically operated dispenser in accordance with the present invention is configured not only to sense for the presence of hands or other objects, but to transmit a communication signal. The automatic dispensing device utilizes a signal processor and an emitter to provide both a sensing signal and a communication signal. Transmit logic in the signal processor generates the detection signal and the communication signal and the signals may be selectively transmitted via the emitter. Accordingly, the apparatus of the present invention is configured to both detect an object in close proximity with the apparatus, and to communicate with a communication device by providing a communication signal containing information for the communication device. A preferred receiver, in accordance with the invention, is configured to both receive reflected detection signals, and to receive communication signals from the communication device. Such functionality is preferably achieved wirelessly.

In one aspect, the present invention relates to a method of remotely servicing an automatically activated flow control device. In accordance with the present invention, the method includes the steps of periodically emitting IR signals from the device indicating the identity and status of the flow control device from which the IR signals are emitted, receiving the emitted signals with a portable communication device and processing the received signals to identify the flow control device requiring service, and indicating to a maintenance technician the identity of the device requiring service and the nature of the problem.

In another aspect the present invention is directed to a communication apparatus in an automatic dispenser for communicating data with a communication device. The apparatus includes an emitter, and logic interface with the emitter to furnish a detection signal and a communication signal to the emitter.

In yet another aspect, the present invention relates to an apparatus for automatic control of fluid flow when an object is in proximity with the apparatus and for communicating with a communication device. The apparatus includes a transmitter for transmitting a detection signal and a communication signal, a receiver for receiving a reflected detection signal, and logic configured to control fluid flow based upon the reflected detection signal.

An additional aspect of the present invention is directed to an automatic dispensing apparatus for controlling fluid flow when an object is in proximity with the apparatus and for transmitting information to a communication device. The apparatus includes logic configured to generate a detection signal and a communication signal, and a driver circuit configured to drive the signals. The apparatus further includes an emitter coupled to the driver circuit for wirelessly emitting the signals, and a receiver for receiving reflections of the detection signal where the reflections provide the basis for controlling the fluid flow.

In still a further aspect, the present invention relates to a method for detecting objects and communicating from an electronically operated dispensing device. The method includes the steps of transmitting a detection signal, detecting a reflection of the detection signal, actuating a valve in response to the detecting step, and transmitting a communicating signal to a communication device.

The remotely managed automatic dispensing apparatus and method of the present invention results in a number of advantages over other devices and methods commonly known in the art. For example, the remotely managed automatic dispensing apparatus and method of the present invention provide for the efficient servicing and maintenance of multiple remotely managed automatic dispensing apparatuses positioned in a single room, such as a public restroom. In accordance with the invention, maintenance personnel may simply enter the room with a portable communication device and determine which if any of the remotely managed automatic dispensing apparatuses are defective, or otherwise require servicing.

Additional features and advantages of the invention will be set forth in a detailed description which follows, and in part will be readily apparent to those skilled in the art from the description or recognized by practicing the invention as described herein.

It is to be understood that both the foregoing general description and the following detailed description are merely exemplary of the invention and are intended to provide an overview or framework for understanding the nature and character of the invention as it is claimed. The accompanying drawings are included to provide further understanding of the invention, illustrate various embodiments of the invention, and together with the description, serve to explain the principles and operation of the invention.

BRIEF DESCRIPTION OF THE DRAWINGS

The invention can be better understood with reference to the following drawings. The elements of the drawings are not necessarily to scale relative to each other, emphasis instead being placed upon clearly illustrating the principles of the invention. Furthermore, like reference numerals designate corresponding parts throughout the several views.

FIG. 3 is a schematic diagram of an exemplary remotely managed dispensing system incorporating the dispensing apparatus depicted in FIG. 2.

FIGS. 4a–4f depict of exemplary control and information screens displayed by the portable communication device (PCD) depicted in FIG. 3.

FIG. 6 is a block diagram illustrating the preferred elements of the transmitting portion of the control module depicted in FIG. 5.

FIG. 7 is a diagram of timing relations for pulses transmitted by the dispensing apparatus of FIG. 2.

FIG. 9 is a diagram illustrating the location of emitter and receiver elements on the sensor module of the dispensing apparatus depicted in FIG. 2.

DETAILED DESCRIPTION OF THE PREFERRED EMBODIMENTS

Because the novel and patentable features of the present invention can be shown with block and other diagrams, conventional electronic elements well known to those skilled in the art, such as transistors, amplifiers, resistors, capacitors, programmable processors, logic arrays, memories and corresponding couplings and connections of such elements are not shown. A person skilled in the art could readily understand the block diagrams illustrating embodiments of the present invention. The block diagrams show specific details that are pertinent to the present invention and do not obscure the disclosure with details that would readily be apparent to those skilled in the art.

Figure 1:
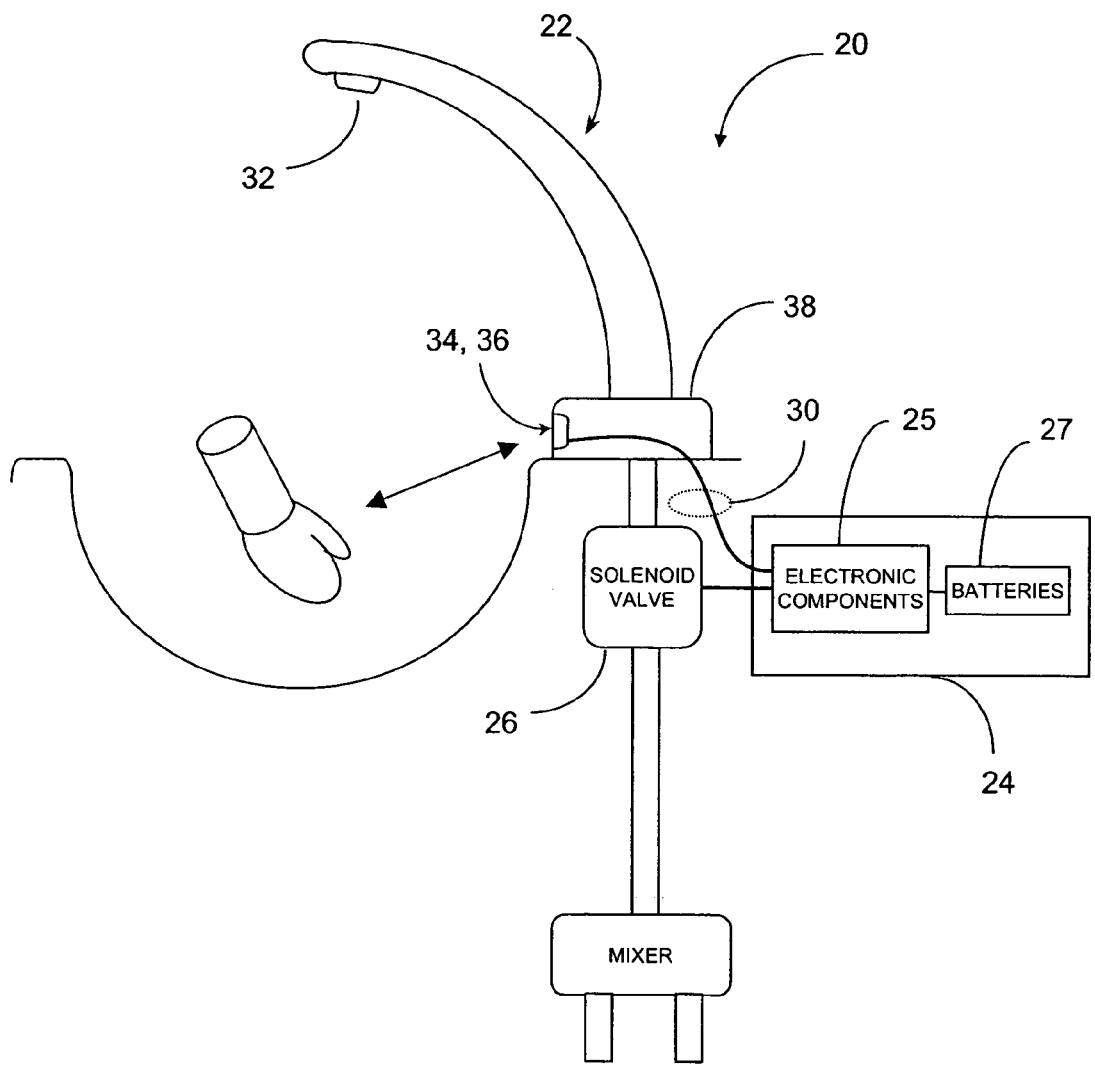
FIG. 1 is a diagram of a conventional electronically operated automatic dispensing device.

A conventional electronically operated flow control device 20 commonly found in the art is shown in FIG. 1. The prior art embodiment depicted in FIG. 1 generally includes a faucet 22, an electronics box 24 for housing electronic components 25 and batteries 27. The electronic components 25 are coupled to a solenoid valve 26, which may move between an open position and a closed position in response to instructions provided by the electronic box 24. Generally speaking, a wiring harness 30 having cables provides power and a communication link between electronics box 24, faucet 22 and solenoid valve 26.

As further shown in FIG. 1, faucet 22 of conventional electronically operated flow control device 20 typically includes an IR emitter 34 and an IR receiver 36 mounted within a collar 38 (or neck) of faucet 22. The IR emitter 34 and the IR receiver 36 cooperate to transmit and receive IR signals, which indicate the presence of a user's hands or other objects in the vicinity of an aerator 32. When a signal emitted from IR emitter 34 is reflected back and received by IR receiver 36, IR receiver 36 generates an electrical signal, referred to as a "reflection signal," that has a voltage corresponding to the signal strength of the reflected IR signal. The reflection signal is coupled through a wire in the wiring harness 30 to electronics box 24. The electronic components 25 process the reflection signal and send a control signal through wiring harness 30 to the solenoid valve 26. When an external object, such as a user's hands, moves into the detection range of IR emitter 34 and receiver 36, the signal strength of the reflected signal and, therefore, the voltage of the reflection signal should be higher than normal. Thus, the electronic components 25 detect the presence of the external object. When the magnitude of the reflection signal is above a particular threshold value a control signal causes the solenoid valve to open, allowing water to flow in faucet 22. In most conventional flow control devices 20 water flows until a timer expires or until the reflection signal is again below the threshold value indicating that the external object is no longer within the detection range of IR emitter 34 and IR receiver 36.

Figure 2:
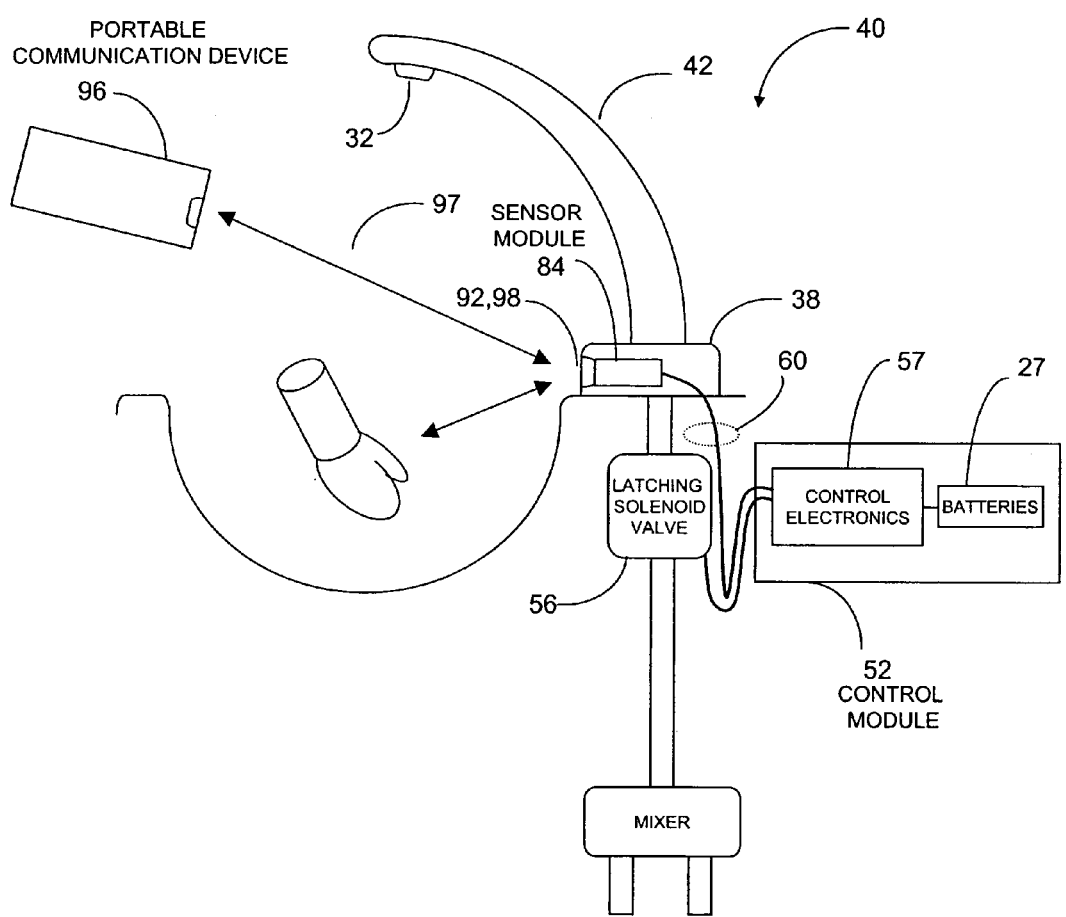
FIG. 2 is a diagram illustrating a preferred electronically operated automatic dispensing device incorporating a portable communication device in accordance with the present invention.

Reference will now be made in detail to a preferred embodiment of the present invention, examples of which are illustrated in the accompanying drawing figures. Wherever possible, the same reference characters will be used throughout the drawings to refer to the same or like parts. An exemplary embodiment of a remotely managed automatic dispensing apparatus of the present invention is shown in FIG. 2, and is designated generally throughout by reference numeral 40.

Remotely managed automatic dispensing apparatus 40 preferably includes a dispensing unit, such as a faucet 42. Faucet 42 preferably includes a collar 38 having an emitter aperture 98 preferably covered by a signal transmissive lens, and a receiver aperture 92, which permit signals, such as, but not limited to, IR signals to exit and enter collar 38. Remotely managed automatic dispensing apparatus 40 further includes a control module 52, a latching solenoid valve 56 that opens and closes in response to signals provided by control module 52. In the preferred embodiment, control module 52 is contained in an enclosure that incorporates an anti-vandalism bracket (not shown). Remotely managed automatic dispensing apparatus 40 may also include one or more flexible sheaths (not shown) for protecting and positioning the electrical cables 60, which provide a communication link between a sensor module 84 (FIG. 5) positioned within collar 38 of faucet 42 and control module 52, and between control module 52 and latching solenoid valve 56.

The primary purposes of the flexible sheathes are to protect the electrical wiring and to position the electrical wiring with respect to control module 52 and latching solenoid valve 56 such that flexible sheathes form one or more drip loops which are designed to capture any water inadvertently running down the electrical wiring from a leak in faucet 42, the sink, or otherwise. A primary objective of the drip loops is to prevent water from entering the cables and reaching the electronics within the control module 52 and/or the latching solenoid valve 56. Gravitational forces act on any water collected in the drip loops thereby preventing that water from contacting the connectors or other electronic circuitry within or adjacent to control module 52 and latching solenoid valve 56.

Remotely managed automatic dispensing apparatus 40 also preferably includes a sensor board or sensor module 84 (FIG. 5) that is particularly well suited for being retrofit within collar 38. The sensor module 84 may be designed similar to or identical to conventional sensor modules employed within conventional flow control devices 20. More specifically, the sensor module 84 may be constructed and arranged so that it may be installed in a collar having only two apertures, which is typical for conventional flow control devices 20.

As will be described in greater detail below, remotely managed automatic dispensing apparatus 40 of the present invention is preferably designed to communicate with a portable communication device 96. The portable communication device 96, which in the preferred embodiment is a reprogrammed personal digital assistant (PDA), is preferably configured to transmit and receive IR signals for establishing a communication link 97 with managed automatic dispensing apparatus 40.

In addition to an IR emitter 86 and an IR sensor 88 such as a detection or object photo detector, sensor module 84 of the present invention preferably incorporates a data or communication IR sensor 90 such as another photo detector, for receiving communication signals from the portable communication device 96. In one embodiment, IR sensor 88 and the communication IR sensor 90 are mounted back-to-back (not shown) on sensor module 84. Generally speaking, photo detector lens 91 is positioned near the front of sensor board 84 for receiving light through receiver aperture 92, while communication photo detector lens 94 faces the rear of IR sensor 88. Transparent silicone sealant fill 93 may hold the sensors 88 and 90 securely in aligned position. Additional arrangements of IR sensors 88, 90 are possible in other embodiments. In particular it is not necessary communication IR sensor 90 to receive IR signals through the hole 99 of IR sensor 88. For example, a side-by-side configuration for sensors 88 and 90 may be employed if desired. Further, in another embodiment a single sensor, such as IR sensor 88 may serve for detecting reflections and for receiving communication signals.

According to techniques that will be described in more detail below, control module 52, sensor module 84 within collar 38, and latching solenoid valve 56 may be utilized to control operation of faucet 42 and to provide information pertaining to the operational state of faucet 42. Similarly, these components may be implemented within and utilized to control other fluid dispensing devices, such as toilets, for example.

As depicted in FIGS. 2 and 9, sensor module 84 is preferably mounted such that IR emitter 86 is positioned behind and aligned with the transmit aperture 98 of collar 38, while detection photo detector 88 and communication photo detector 90 are positioned behind and aligned with the receive aperture 92 of collar 38. So arranged, the IR signals emitted by IR emitter 86 are transmitted through transmit aperture 98, and both the reflected signal from IR emitter 86 and the communication signal emitted by a portable communication device 96 for controlling and managing the operation of automatic dispensing apparatus 40 are received through receive aperture 92. When desired, automatic dispensing apparatus 40 may send information to portable communication device 96 (upstream information) through transmit aperture 98. Further, automatic dispensing apparatus 40 may receive information from portable communication device 96 (downstream information) through receive aperture 92. Typically, most IR devices, such as the IR emitter 86 and IR detectors 88, 90, have an integrated lens to focus infrared signals and protect the semiconductor material.

As shown in FIG. 2, portable communication device 96, such as a Palm IIIe™ manufactured by 3com®, which preferably utilizes the Palm Computing Platform®, for example, may be configured to communicate with the remotely managed automatic dispensing apparatus 40 of the present invention. Generally speaking, the portable communication device 96 used to communicate with the remotely managed automatic dispensing apparatus 40 of the present invention includes an IR emitter and IR sensor that provide for exchange of data via IR signals passed through apertures 92, 98. It will be understood by those skilled in the art, however, that other devices and particularly portable devices, such as personal digital assistants manufactured by other manufacturers, cellular telephones, pagers, portable computers, and the like may be used to communicate with the remotely managed automatic dispensing apparatus 40 of the present invention. In addition, communication signals other than IR signals may be used to transfer data between any such portable communication device and the remotely managed automatic dispensing apparatus 40 of the present invention. It is not necessary that a device communicating with the remotely managed automatic dispensing apparatus 40 be a portable device configured for IR communication. For example, one or more wires may be coupled to the remotely managed dispensing apparatus 40 to serve as a communication channel for a non-portable communication device. This being said, the preferred embodiments of the present invention will be described hereafter with reference to the portable communication device 96 being the Palm IIIe™, but the preferred embodiments are in no way intended to be limited only to the above mentioned PDA.

Generally speaking, the present invention provides an improved maintenance and monitoring system for use in commercial facilities such as office buildings, manufacturing plants, warehouses, or the like. For example, public restrooms in an office building may benefit from such a system in that such a system may facilitate the efficient operation, management and servicing of multiple conventional automatic flow control devices throughout the building. More specifically, conventional automatic flow control devices are battery powered and therefore require battery replacement. In addition, there are typically a plurality of such devices in any given restroom within the building. As one would expect, the maintenance of such conventional dispensing devices is both time consuming and labor intensive since maintenance personnel have no efficient way of determining whether such devices require battery replacement or are otherwise defective. As a general rule, manual interaction with each device is required to make these determinations. For example, maintenance personnel position their hands beneath the aerator of each conventional automated sink to determine if the faucet is operating correctly. Troubleshooting, however, requires the time consuming steps of removing the cover of electronics box 24, and physically checking and analyzing the circuitry and other components thereof. Accordingly, there is a need for an improved maintenance and monitoring system for commercial facilities having large numbers of automatic flow control devices.

As depicted schematically in FIG. 3, remotely managed automatic dispensing apparatus 40 may be a part of a remotely managed automatic dispensing system 100. System 100 preferably includes a plurality of remotely managed automatic dispensing apparatuses $40_1$, $40_2$, ..., $40_N$, each having an associated dispensing unit, such as a faucet 42 or other dispensing device. The portable communication device 96 may exchange data with each of the automatic dispensing apparatuses via one or more IR communication links 97. A site computer 102 capable of communicating with portable communication device 96 may store information about each of the site's managed automatic dispensing devices. Optionally, one of ordinary skill in the art will recognize that system 100 may be monitored and controlled in a network environment. In a preferred embodiment, a remote server 108 may receive data relating to system 100 from PCD 96 or a site computer 102 over the Internet 110 or other network environment via any standard network connection.

System 100 of the present invention largely obviates the need for manual troubleshooting or servicing of dispensing devices. By implementing the system 100 of FIG. 3, maintenance personnel may enter an area, for example a restroom, containing numerous remotely managed automatic dispensing apparatuses 40 of the present invention, communicate with one or more of the apparatuses 40, and determine which, if any, of the apparatuses are defective or otherwise require servicing based on data communicated from the one or more apparatuses 40. In accordance with the preferred system 100 of the present invention, a failing or malfunctioning apparatus 40 may automatically discover an operational problem and broadcast an IR data signal indicating the nature of the problem. This IR data signal may indicate, for example, the serial number, location, and problem, among other things for the defective apparatus 40 in the room. Depending upon the nature of the problem associated with one or more of the apparatuses 40, portable communication device 96 may preferably provide the maintenance person with troubleshooting information indicative of the problem. Moreover, PCD 96 may also be used to repair defective apparatuses 40. For example, when the problem associated with a defective apparatus 40 is software related, PCD 96 may be used to transmit a software update or otherwise reprogram defective apparatus 40 by transmitting software updates via IR.

In addition, portable communication device 96 preferably includes memory for storing information such as the maintenance history and/or software update history of each device, or an installation and user's guide that may be used by maintenance personnel to install and operate new apparatuses 40. The memory may also be used to maintain records of data gathered or entered for each apparatus 40, by serial number. More preferably, portable communication device 96 may be used to transmit, to one or more apparatuses 40, commands for adjusting apparatus parameters such as IR range, and/or update the software of a given apparatus 40, thus largely eliminating the need for maintenance personnel to open the electronics box 52 and physically access one or more of the apparatus boards. Such commands may be received by IR sensor 90 and processed by signal processor 132 (FIG. 5).

Information collected by portable communication device 96 may also be transferred to a site computer 102 for updating device records in stored memory of the site computer. In addition, any information transmitted by any apparatus 40 to portable communication device 96 may be sent to a web server 108 via the Internet 110 where the information may be logged and stored in a relational database, such as Microsoft Access, for device fault analysis or other research. Additionally, web server 108 may generate and deliver responses to trouble reports received from portable communication device 96 and system updates to site computer 102 via the Internet 110.

FIGS. 4a–4f depict various display screens, as viewed on portable communication device 96, that may be used in connection with system 100 of the present invention. For example, a control panel screen 112 displays, on portable communication device 96, a menu of selectable items for the managed automatic dispensing apparatus 40. By way of example, but not limitation, a user may select "Information" from screen 112 and obtain information about a faucet as viewed on Information screen 114. Adjust screen 115 provides inputs for adjusting faucet parameters, such as detection distance, flow mode, and time on. Additional example screens are shown in FIGS. 4d–4f and provide maintenance personnel with information that will reduce troubleshooting time and time to repair. The depicted screens represent preferred examples of the types and arrangements of information that may be available to maintenance personnel on display screens provided by PCD 96.

Figure 5:
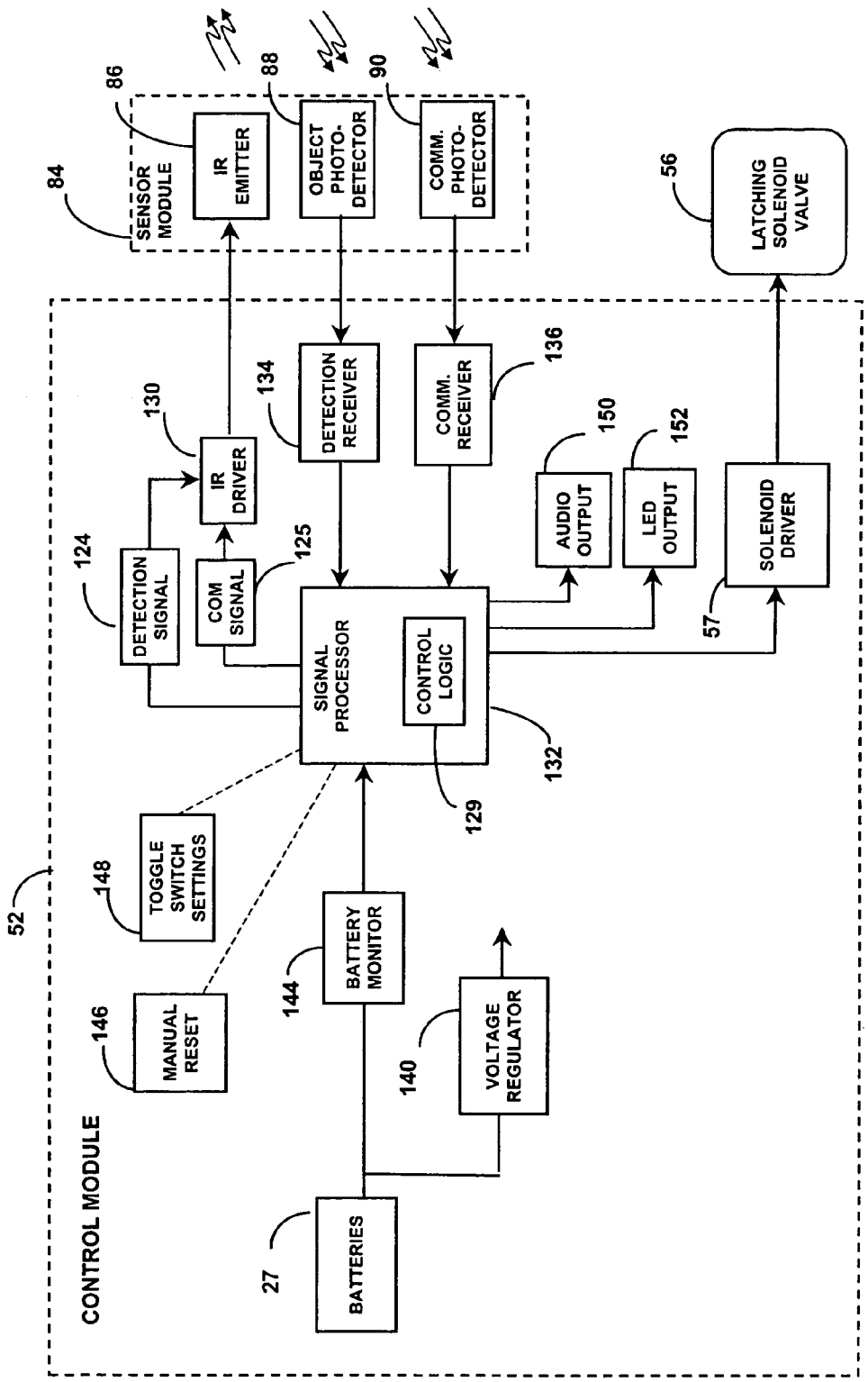
FIG. 5 is a block diagram illustrating a the preferred elements of the control module depicted in FIG. 2.

The block diagram of FIG. 5 illustrates a more detailed view of control module 52 and sensor module 84. The control module includes control logic 129 for controlling the operation of remotely managed dispensing apparatus 40. The control logic may be implemented in hardware, software or a combination thereof. In the preferred embodiment, the control logic 129 is implemented in software and stored within a signal processor, such as, for example, a Motorola microprocessor (MC88HC908GP32CF8) having flash memory, analog-to-digital (A/D) converters and a variety of input and outputs as are described in the vendor's data sheets. When the remotely managed dispensing apparatus 40 is implemented as a faucet that dispenses fluid into a sink, the electronics of the remotely managed dispensing apparatus 40 may preferably be located in sensor module 84 contained in the collar 38 of the faucet and in control module 52, which is typically mounted under the sink. The two modules 52, 84 may be electrically connected via cables 60 (FIG. 2). In addition, a cable extends from the control module 52 to a latching solenoid valve 56 that directly controls fluid flow. The control module 52 is preferably positioned in a secure enclosure while the sensing electronics or sensor module 84 is preferably positioned on a sensor board potted in collar 38 of the faucet. The potted arrangement reduces the likelihood that water will come into contact with the sensing electronics, and thus minimizes the risk of corrosion and other damage to these parts.

The signal processor 132 provides a detection signal 124 and a communication signal 125 for transmission from an IR emitter 86 in the sensor module 84. The detection signal 124, preferably generated by the control logic 129, is a sequence of one or more narrow pulses. In the preferred embodiment, the pulses occur several times per second although other time intervals may be utilized in other embodiments. The detection signal is preferably sent to IR driver circuit 130 and coupled via a cable to the IR emitter that wirelessly transmits the narrow IR pulses. In the preferred embodiment, one pulse is transmitted every 250 milliseconds. The detection signal is transmitted when the automatic dispensing apparatus is in a detection mode and the communication signal is transmitted when the automatic dispensing apparatus is in a communication mode. The managed automatic dispensing apparatus in the preferred embodiment transfers from the communication mode back to the detection mode when control logic 129 determines that all information has been exchanged.

Reflected detection signals are detected by an object photo detector 88 and are thereafter coupled to the signal processor 132 via a detection receiver 134. Other receiver elements such as a filter or amplifier, or both may be utilized to process the reflected signals detected by the object photo detector 88. In the detection mode, the managed automatic dispensing apparatus transmits a detection signal, receives reflected detection signals, and remains in the detection mode until there is a request to transfer to a communication mode. The communication mode request may be initiated by the portable communication device 96 as disclosed in a co-pending U.S. patent application Ser. No. filed Oct. 23, 2001, entitled, "Data Communications System and Method For Communication Between Infrared Devices," and assigned Ser. No. 10/035,750, which is hereby incorporated herein by reference, if desired, or may be initiated by the control logic 129. A request by the PCD 96 for switching to the communication mode preferably is initiated by a transmission of a known digital sequence from the PCD 96. Once the known sequence is detected by the communication photo detector 90, communicated to control logic 129 via communication receiver 136, and verified by control logic 129, the automatic dispensing apparatus 40 transitions to the communication mode. When the managed automatic dispensing apparatus 40 is in the communication mode, the control logic 129 transmits a communication signal to the IR emitter 86. The communication signal may require a boost from the IR driver circuit 130 before being transmitted to the IR emitter 86. The non limiting communication signal of the present invention may be based on the specifications described in an IR Data Association Specification and may be limited to half duplex transmission at or less than 9600 bps. Those skilled in the art could use a variety of modulation technologies to provide for information or data exchange.

When the object photo detector 88 generates a signal in response to reflected signals from an object, such as a person's hand, the signal is communicated to signal processor 132. If the signal is greater than a threshold value, receive logic in the signal processor provides an open valve signal to a solenoid driver 57. Solenoid driver 57 and any associated electrical components can be similar or identical to an H-bridge circuit described in U.S. Pat. No. 5,819,336, which is hereby incorporated herein by reference. The solenoid driver 57 is adapted to drive a latching solenoid valve 56 that opens in response to the open valve signal or closes in response to a close valve signal from the signal processor 132.

The control module 52 may be powered by one or more batteries 27 or by some other suitable power source. One embodiment of the present invention incorporates four (4) AA batteries in series (around 6 volts) coupled to a voltage regulator 140 for providing a regulated voltage of three (3) volts for most of the electronics and uses six (6) volts to power the latching solenoid valve 56 and the IR emitter 86. An audio output 150 and LED output 152 serve as troubleshooting indicators. For example, if the battery voltage is low, the LED preferably exhibits a defined on/off pattern. A battery monitor 144 serves several functions. Under no-load conditions, the battery monitor 144 determines, comparing the battery voltage with a known voltage, if the battery should be replaced. In addition, the battery monitor 144 may determine if the windings in the latching solenoid valve 56 are in an open circuit condition or in a short circuit condition by observing the battery loading characteristics. Information from the battery monitor 144 may be sent to the portable communication device 96 when the remotely managed dispensing apparatus 40 is in the communication mode. In addition, an audio signal from the audio output device 150 or a visual output from the LED output 152 may be used to notify maintenance technicians of a variety of identified problems.

FIG. 6 is a block diagram illustration of timing aspects of the automatic dispensing apparatus 40 of the present invention. The control logic 129 preferably generates a detection signal 124 when the managed automatic dispensing apparatus 40 is in the detection mode and preferably generates a data communication signal 125, for the upstream direction, when the managed automatic dispensing apparatus 40 is in the communication mode. The control logic 129 processor is configured to generate either the detection signal 124 or the communication signal 125, but the control logic 129 preferably does not generate the signals simultaneously. The signal generated by the control logic 129 is sent to a digital-to-analog converter (DAC) 160 and is preferably conditioned by driver circuit 133. An output from the driver circuit 132 is coupled over a communication link such as a wire to the IR emitter 86 in sensor module 84. Preferably, a transmit aperture 98 in collar 38 of the dispensing device allows the infrared signal to exit from an emitter lens integrated in IR emitter 86. Other arrangements of emitters, lenses, and apertures may provide other embodiments for transmission of infrared signals. The method of generation of the above-mentioned transmit signals is not a limitation of the present invention. In the preferred embodiment, both the pulse width and the pulse height of the detection signal and communication signal may be controlled. For example, the width of the signal preferably is controlled utilizing transistors, and the height of the signal is preferably controlled by a digital value sent to a DAC. The arrangement of the transistors and the DAC could be implemented by those skilled in the art.

FIG. 7 is a timing diagram 70 showing an event repeat time 72, which is preferably approximately 250 milliseconds in the preferred embodiment. Within the repeat time, there is an activity time 74 of around 200 microseconds. During the activity time three samples are taken and stored within memory of the signal processor 132. In addition the control logic 129 generates a detection signal 124, positioned in time as shown in FIG. 7. Control logic 129 samples the battery condition 77, then samples a reflection signal 78, and finally samples the ambient condition 79 (such as room lighting). The reflection sample 78 and ambient sample are taken from object photo detector 88. The reflection sampling occurs immediately after or as the detection signal, represented by pulse width 76 (approximately 60 microseconds), is transmitted. The ambient sampling is used to determine the light levels when no reflections occur. Those skilled in the art would appreciate that variations of the sampling times is not a limitation on the present invention. In general, narrow pulses pull less energy from the battery providing for energy savings, but narrow pulses contain higher frequencies than wide pulses. Components that process the higher frequencies associated with the narrow pulses typically cost more and a cost/efficiency factor is a design consideration. When the repeat time is 250 milliseconds as shown in FIG. 7, the activity time occurs approximately four (4) times per second. Experience has shown that this frequency of activity satisfies the needs of a person using the automatic dispensing unit of the present invention. The use of the ambient sample and the reflection sample are inputs to an adjustment algorithm described in co-pending U.S. patent application Ser. No. filed Oct. 23, 2001, entitled, "Method of Automatic Standardized Calibration for Infrared Sensing Device," assigned Ser. No. 10/045,302, and U.S. Pat. No. 6,639,209 filed Oct. 23, 2001, entitled, "System and Method of Automatic Dynamic Calibration for Infrared Sensing Device," assigned Ser. No. 10/714,806, both of which are hereby incorporated herein by reference. In addition to the three samples described above, other samples may be taken to determine the condition of elements within the automatic dispensing apparatus 40 of the present invention. For example, samples taken when the latching solenoid valve 56 is activated may be used to determine changes in the required activation power. Changes in the activation power may give an indication of the solenoid's condition or could indicate above normal pressure in the water supply line. Neither the number of samples, type of samples, or order of samples is considered a limitation on the present invention.

Figure 8:
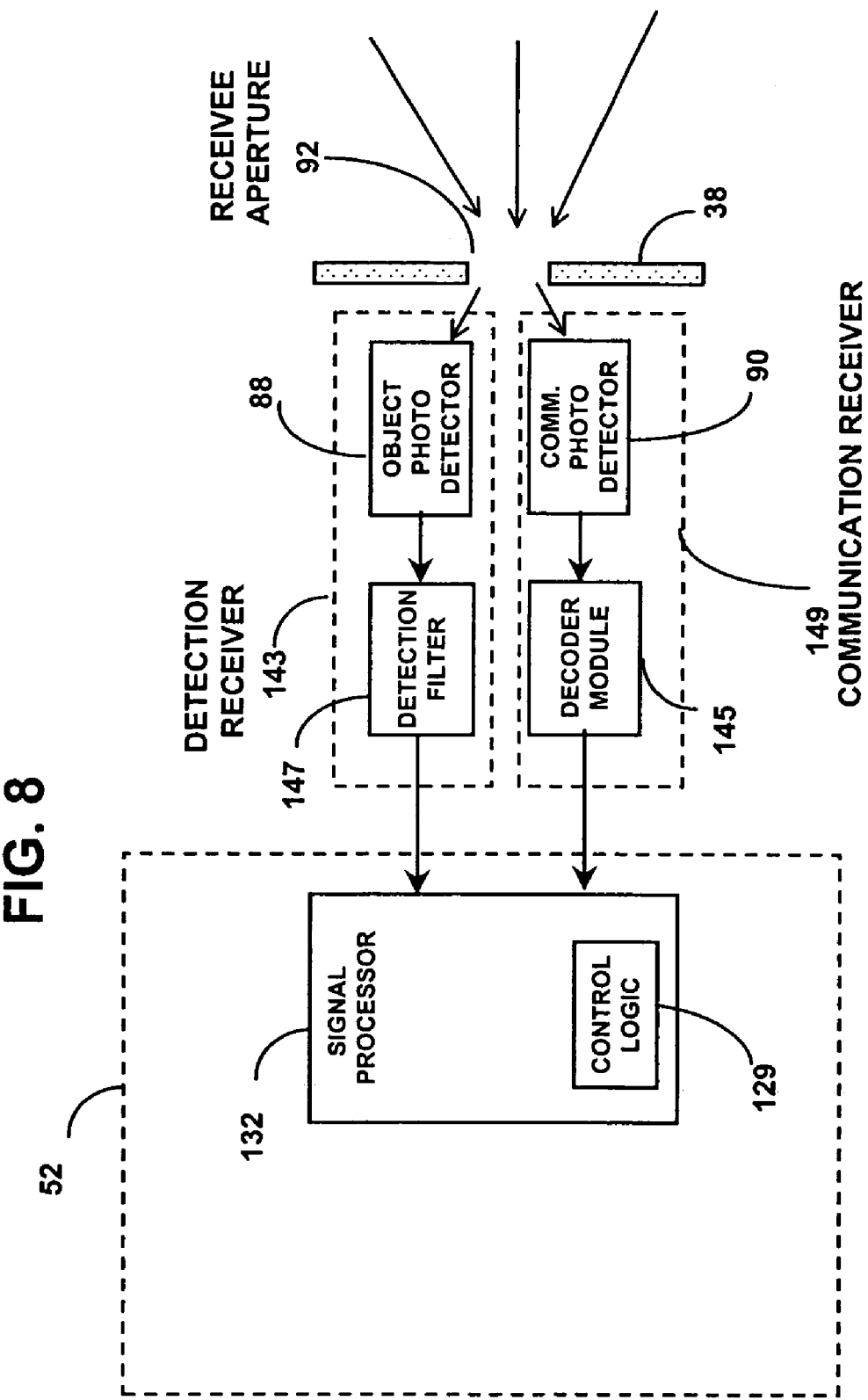
FIG. 8 is a block diagram illustrating the preferred elements of the receiving portion of the control module depicted in FIG. 5.

FIG. 8 is a block diagram showing a preferred receiver arrangement in accordance with the preferred electronically operated dispensing apparatus of the present invention. As shown in the diagrammatic illustration a detection receiver 143 and a communication receiver 144 are shown side-by-side. The detection receiver 143 includes object photo detector 88 coupled to a detection filter 147. The output of detection filter 147 preferably is coupled to and processed by the control logic 129. The communication receiver 149 includes the communication photo detector 90 coupled to a decoder module 145, the output of which is processed by the control logic 129. In one embodiment, the object photo detector 88 and the communication photo detector 90 may be arranged back-to-back (not shown). Various other embodiments, however, are also possible. For example, in another embodiment a single photo detector could provide signals to the detection filter and a decoder module. An arrangement of filters could also be used to separate the lower frequencies of the reflection signals from the higher frequencies of the communication signals. A more preferred embodiment will be described below with reference to FIGS. 10a–10c. While only a single aperture is shown in FIG. 8, a communication lens and detection lens may be incorporated with photo detectors 88 and 90. The arrangement and location of the aperture and lenses are not intended to limit the scope of the present invention.

FIG. 9 illustrates an exemplary top view mounting arrangement for the IR emitter 86 and the two IR detectors or photo detectors 88, 90. When the emitter and detectors are mounted on a sensor Printed Circuit Board (PCB) of the sensor module 84, the PCB fits within the collar 38 of the automatic dispensing apparatus 40. In addition to the emitter and detectors, other electronic components (not shown) may reside on the PCB. As one of skill in the art will readily recognize, one or more cables preferably couple the PCB to the control module 52.

Figure 10A:
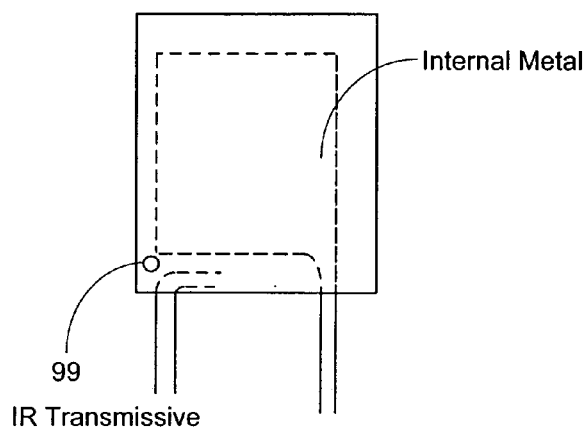
FIG. 10a–10c illustrate various views of a front-to-back mounting of photo diodes in accordance with a preferred embodiment of the present invention.
Figure 10B:
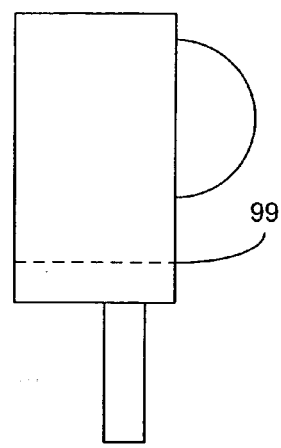
Figure 10C:
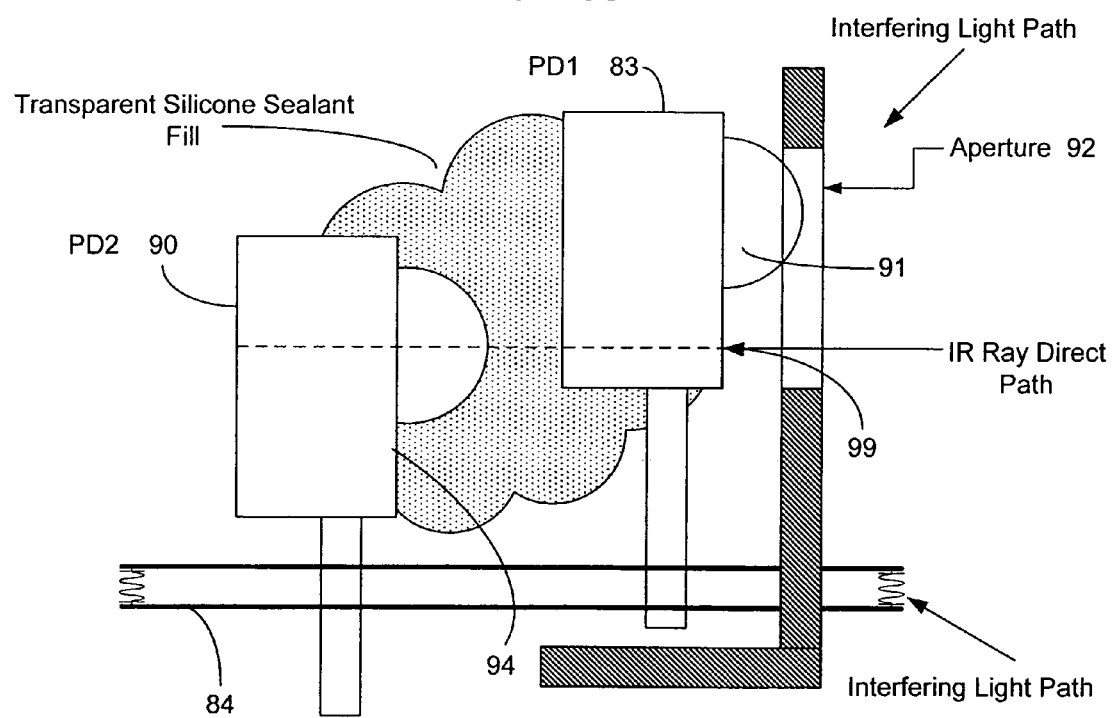

FIGS. 10a–10c illustrate a preferred front-to-back arrangement for the two IR detectors or diodes 88, 90. Object photo diode 88 is mounted at the front of the sensor printed circuit board and the communication photo diode 90 is mounted behind and preferably offset slightly from photo diode 88. The diodes are preferably positioned some stand-off distance from one another, and secured in the positions as shown with transparent silicone sealant fill 93 as depicted in FIG. 10c. The object photo diode 88 preferably includes an IR transmissive aperture 99 that provides for IR signal coupling between an IR source, such as portable communication device 96, and communication photo diode 90. Generally speaking, the above mentioned arrangement allows IR signals to pass through aperture 99 to communication photo diode 90, thus providing better IR reception of data signals than the back-to-back arrangement. Although other sensors may be employed in accordance with the present invention, the preferred object photo diode 88 may be a diode identified by part number BPV23F and the communication photo detector 90 may be a diode identified by part number BPV22F, both of which are manufactured by Vishay Intertechnology, Inc. The photo diodes 88, 90 are preferably mounted on the sensor printed circuit board with conventional electronic components. In addition, and as indicated in FIG. 10c, the arrangement positioned behind a single aperture has the effect of minimizing interference from undesired light sources, such as sunlight or room lighting.

Because the automatic dispensing apparatus 40 in the described embodiment is battery powered, it may be desirable to utilize a battery savings methodology. Such a battery saving methodology is embodied when the control logic 129 configures the signal processor 132 to operate in an on mode, a wait mode, and a stop mode. When the automatic dispensing apparatus 40 is installed and functioning, the signal processor is in the on mode approximately 2.8% of the time, the stop mode nearly 97% of the time, and the wait mode for around 0.2% of the time. A low frequency clock frequency of 32.768 KHz is preferably applied to the signal processor during the stop mode allowing the signal processor to operate on about 50 microamps. When a timer, functioning in the stop mode, reaches a given value, the signal processor transitions to the on mode. During the on mode the clock frequency for the signal processor is approximately 4 MHz, requiring an operational current of about 4 milliamps for the signal processor. The wait mode requires around 1 milliamp of current, and is used for special purposes, such as providing power for operation of the control logic for the latching solenoid drivers during a transition between the on mode and the stop mode. Where the detection signal is an emitter pulse that is preferably sent 4 times per second with a pulse width of around 59 microseconds, the power requirement for the emitter 86 of the automatic dispensing apparatus 40 is significantly reduced. Conventional dispensing devices send pulses around 8 times per second with a pulse width of over 200 microseconds. In addition, modifications to the latching solenoid valve circuits have provided an additional reduction in energy requirements.

The battery saving methodology described above allows an embodiment of the remotely managed automatic dispensing apparatus to operate on four (4) AA batteries, where each battery is capable of supplying around 2500 mAhours. Conventional dispensing devices typically require four (4) C batteries, where each battery is capable of supplying around 7100 mAhours. The reduction, of nearly 65%, in power requirements and the associated benefits of reduced cost and size represents a significant improvement over conventional dispensing devices.

In the preferred embodiment, the present invention normally operates in the detection mode, to provide the function of dispensing water. A method or procedure is provided in accordance with the present invention to transfer from the detection mode to the communication or data mode. Since the PDA communication protocol is preferably based on the IRDA specifications, it is preferable to send a known sequence to the sensor module 84 from the portable communication device 96 for at least 300 milliseconds since the operational mode for the control module 52 typically occurs for a brief amount of time every 250 milliseconds. When the control module detects the known sequence a detection mode to communication mode transition is initiated as described in the co-pending U.S. patent application Ser. No. filed, Oct. 23, 2001, and entitled, "Data Communications System and Method for Communication Between Infrared Devices," and assigned Ser. No. 10/035,750, which was previously incorporated herein by reference.

It will be apparent to those skilled in the art that various modifications and variations can be made to the present invention without departing from the spirit and scope of the invention. For example, the remote IR detecting apparatus may be a lap top computer, a cellular telephone, a pager, or any other portable device capable of transmitting and receiving IR or near-IR signals. In addition, reflective filtering techniques such as these disclosed in the co-pending U.S. patent application Ser. No. filed Oct. 23, 2001, entitled, "System and Method for Filtering Infrared," and assigned Ser. No. 10/045,331, which is hereby incorporated herein by reference, are intended to form a part of this specification. Thus it is intended that the present invention cover the modifications and variations of this invention provided they come within the scope of the appended claims and their equivalents.

We claim:

1. An apparatus for automatic control of fluid flow in response to the proximity of an object to the apparatus and for communicating with a communication device, the apparatus comprising:
   a single infrared transmitter for selectively, alternately transmitting both an infrared detection signal and a transmitted infrared communication signal;
   an infrared receiver for receiving a reflected infrared detection signal;
   an infrared receiver for receiving a received infrared communication signal; and
   logic operatively connected to drive said transmitter to transmit said infrared detection signal and said transmitted infrared communication signal, said logic also being operatively configured to receive said reflected infrared detection signal and said received infrared communication signal from said receivers, said logic being configured to include, in said transmitted communication signal information indicative of an operational state of the apparatus, said logic also being configured to control fluid flow based upon the reflected detection signal.

2. An apparatus as defined in claim 1, wherein said infrared detection signal comprises a sequence of pulses.

3. An apparatus as defined in claim 1, wherein said logic is configured to exclude simultaneous transmission of said infrared detection signal and said transmitted infrared communication signal.

4. An apparatus as defined in claim 1, wherein said infrared detection signal comprises pulses having a repetition rate of between two and ten Hertz.

5. An apparatus as defined in claim 1, wherein said transmitted and received infrared communication signals each comprise a sequence of pulses representing data.

6. An apparatus as defined in claim 1, wherein the data rate for said transmitted and received infrared communication signals is approximately 9600 bits per second.

7. An apparatus as defined in claim 1, wherein the coupling between the logic and said transmitter comprises a digital-to-analog converter and an infrared driver.

8. An apparatus as defined in claim 1, wherein said infrared receiver for receiving said reflected infrared detection signal and said infrared receiver for receiving said received infrared communication signal are configured in a back-to-back arrangement.

9. An apparatus as defined in claim 1, wherein said infrared receiver for receiving said reflected infrared detection signal and said infrared receiver for receiving said received infrared communication signal each comprise a photo detector.

10. An apparatus as defined in claim 1, wherein said infrared receiver for receiving said reflected infrared detection signal and said infrared receiver for receiving said received infrared communication signal together comprise a single photo detector.

11. An apparatus as defined in claim 1, additionally comprising a threshold detector for comparing said reflected infrared detection signal to a threshold value and providing the result of the comparison as an output to said logic.

12. An apparatus for automatic control of fluid flow when an object is in proximity with said apparatus and for communicating with a communication device, said apparatus comprising:
    a transmitter for transmitting a detection signal and a communication signal;
    a receiver for receiving a reflected detection signal; and
    logic configured to control fluid flow based upon said reflected detection signal;
wherein said receiver comprises an infrared detector having a hole, wherein said apparatus further comprises another infrared detector such that an infrared signal may pass through said hole and be received by said other infrared detector.

13. An apparatus for automatic control of fluid flow in response to the proximity of an object to the apparatus and for communicating with a communication device, the apparatus comprising:
    a transmitter device for selectively, alternately transmitting both a detection signal and a transmitted communication signal;
    a receiver device for receiving a reflected detection signal and a received communication signal; and
    logic operatively connected to drive said transmitter device to transmit said detection signal and said transmitted communication signal, said logic also being operatively configured to receive said reflected detection signal and said received communication signal from said receiver device, said logic being configured to include, in said transmitted communication signal, information indicative of an operational state of the apparatus, said logic also being configured to control fluid flow based upon the reflected detection signal.

14. An apparatus as defined in claim 13, wherein each of said signals comprises an infrared signal.

15. An apparatus as defined in claim 13, wherein each of said signals a sequence of digital pulses.

16. An apparatus as defined in claim 13, wherein said logic is configured to exclude simultaneous transmission of said detection signal and said transmitted communication signal.

17. An apparatus as defined in claim 13, wherein said receiver device comprises a single photo detector.

18. An apparatus as defined in claim 13, wherein said receiver device comprises a receiver for receiving said reflected detection signal and a receiver for receiving said received communication signal.

19. An apparatus as defined in claim 18, wherein said receiver for receiving said reflected infrared detection signal and said receiver for receiving said received infrared communication signal are configured in a back-to-back arrangement.

20. An apparatus as defined in claim 13, additionally comprising a threshold detector for comparing said reflected detection signal to a threshold value and providing the result of the comparison as an output to said logic.

21. An apparatus for automatic control of fluid flow in response to the proximity of an object to the apparatus and for communicating via bidirectional telemetry with an external communication device, the apparatus comprising:
    a transmitter device for transmitting both a detection signal and a transmitted communication signal for receipt by an external communication device;
    a receiver device for receiving a detection signal reflected from an object in proximity to the apparatus and a received communication signal received from an external communication device; and
    logic operatively connected to drive said transmitter device to transmit said detection signal, said logic also being operatively configured to communicate bidirectionally with an external communication device by causing said transmitter device to transmit said transmitted communication signal and receiving said received communication signal from said receiver device, said logic also being configured to control fluid flow based upon the reflected detection signal.

22. An apparatus as defined in claim 21, wherein each of said signals comprises an infrared signal.

23. An apparatus as defined in claim 21, wherein each of said signals a sequence of digital pulses.

24. An apparatus as defined in claim 21, wherein said logic is configured to exclude simultaneous transmission of said detection signal and said transmitted communication signal.

25. An apparatus as defined in claim 21, wherein said receiver device comprises a single photo detector.

26. An apparatus as defined in claim 21, wherein said receiver device comprises a receiver for receiving said reflected detection signal and a receiver for receiving said received communication signal.

27. An apparatus as defined in claim 26, wherein said receiver for receiving said reflected infrared detection signal and said receiver for receiving said received infrared communication signal are configured in a back-to-back arrangement.

28. An apparatus as defined in claim 21, additionally comprising a threshold detector for comparing said reflected detection signal to a threshold value and providing the result of the comparison as an output to said logic.

* * * * *

UNITED STATES PATENT AND TRADEMARK OFFICE
CERTIFICATE OF CORRECTION

PATENT NO. : 6,955,333 B2
DATED : October 18, 2005
INVENTOR(S) : Wade C. Patterson and Thomas J. Watson It is certified that error appears in the above-identified patent and that said Letters Patent is hereby corrected as shown below:

<u>Title page,</u>
Item [54], Title, "APPARATUS AND METHOD OF WIRELESS" should be
-- APPARATUS AND METHOD FOR WIRELESS --.

Signed and Sealed this

Twenty-eighth Day of March, 2006

JON W. DUDAS
*Director of the United States Patent and Trademark Office*